(12) United States Patent
Lien

(10) Patent No.: US 10,585,833 B1
(45) Date of Patent: Mar. 10, 2020

(54) FLEXIBLE PCIE TOPOLOGY

(71) Applicant: Quanta Computer Inc., Taoyuan (TW)

(72) Inventor: Yu-Chen Lien, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 0 days.

(21) Appl. No.: 16/259,488

(22) Filed: Jan. 28, 2019

(51) Int. Cl.
*G06F 13/40* (2006.01)
*G06F 13/42* (2006.01)
*G06F 9/38* (2018.01)

(52) U.S. Cl.
CPC ...... *G06F 13/4022* (2013.01); *G06F 13/4221* (2013.01); *G06F 9/3877* (2013.01); *G06F 2213/0026* (2013.01); *G06F 2213/3808* (2013.01)

(58) Field of Classification Search
None
See application file for complete search history.

(56) References Cited

U.S. PATENT DOCUMENTS

| 7,147,476 B1* | 12/2006 | Chang .................. H01R 12/721 439/62 |
| 2006/0143347 A1* | 6/2006 | Kuo .......................... G06F 1/30 710/106 |
| 2012/0033370 A1* | 2/2012 | Reinke .................... G06F 1/185 361/679.4 |
| 2017/0177528 A1* | 6/2017 | Harriman ................. G06F 13/36 |
| 2018/0052793 A1* | 2/2018 | Fang ....................... G06F 13/385 |
| 2018/0322082 A1 | 11/2018 | Breakstone et al. |

FOREIGN PATENT DOCUMENTS

| CN | 107992438 A | 5/2018 |
| EP | 3242218 A1 | 11/2017 |

OTHER PUBLICATIONS

Extended European Search Report for EP Application No. 19186365.3, dated Jan. 7, 2020.

* cited by examiner

*Primary Examiner* — Idriss N Alrobaye
*Assistant Examiner* — Dayton Lewis-Taylor
(74) *Attorney, Agent, or Firm* — Nixon Peabody LLP; Zhou Lu

(57) ABSTRACT

The present disclosure provides a system and method for enabling a flexible PCIe topology in a computing system. The flexible PCIe topology can allow a user to adjust PCIe connections between CPUs and components of the computing system based upon a specific application. In some implementations, the computing system comprises a plurality of CPUs, a plurality of GPUs or Field-Programmable Gate Arrays (FPGAs), a plurality of PCIe switches, and a plurality of network interface controllers (NICs). In some implementations, the computing system comprises a switch circuit to connect the plurality of CPUs, the plurality of PCIe switches, and the plurality of NICs. The switch circuit comprises a plurality of inputs and a plurality of outputs to connect the plurality of CPUs, the plurality of PCIe switches and the plurality of NICs. Connection routes within the switch circuit can be adjusted to set a specific PCIe topology of the computing system.

20 Claims, 13 Drawing Sheets

FLEXIBLE PCIE TOPOLOGY

FIELD OF THE INVENTION

The disclosure generally relates to computer server systems, more particularly to computer server systems with a flexible configuration.

BACKGROUND

Modern computing systems comprise numerous electronic components such as Graphics Processing Units (GPUs), Central Processing Units (CPUs), Random-Access Memory (RAM), etc. As a computing system becomes more complex to support demand from users for computing and other applications, multiple GPUs and/or CPUs are often required within the same computing system.

Traditionally, computing systems are designed with a fixed Peripheral Component Interconnect Express (PCIe) topology to support multiple GPUs and CPUs. A user of a computing system cannot change the PCIe topology of the computing system. However, a specific PCIe topology that is ideal for a particular application may be inefficient for some other applications (e.g., other GPU applications).

SUMMARY

Systems and methods, in accordance with various examples of the present disclosure, provide a solution to the above-mentioned problems by enabling a flexible PCIe topology in a computing system. The flexible PCIe topology can allow a user or a management controller of the computing system to adjust PCIe connections between CPUs and components of the computing system based upon a specific application. In some implementations, the computing system comprises a plurality of CPUs, a plurality of GPUs or Field-Programmable Gate Arrays (FPGAs), a plurality of PCIe switches, and a plurality of network interface controllers (NICs). In some implementations, the computing system comprises a switch circuit to connect the plurality of CPUs, the plurality of PCIe switches, and the plurality of NICs. The switch circuit comprises a plurality of inputs and a plurality of outputs to connect the plurality of CPUs, the plurality of PCIe switches and the plurality of NICs. Connection routes within the switch circuit can be adjusted to set a specific PCIe topology of the computing system. The specific PCIe topology includes, but is not limited to, a full configuration mode, a balance mode, a common mode, and a cascade mode.

In some implementations, the switch circuit is connected to a Dual-Inline-Package (DIP) switch. The DIP switch is configured to set connection routes among the plurality of inputs and the plurality of outputs of the switch.

In some implementations, the switch circuit comprises a plurality of multiplexers (MUXs) to connect the plurality of inputs and the plurality of outputs. The DIP switch can set the connection status of each of the plurality of MUXs, and hence set connection routes among the plurality of inputs and the plurality of outputs.

In some implementations, at least one connection route among the plurality of CPUs, the plurality of PCIe switches and the plurality of NICs includes multiple mini SAS connectors, and at least one physical PCIe cable. A specific PCIe topology of the computing system can be set by adjusting connection routes among the multiple mini SAS connectors and/or a golden finger repeater board installed on one of the plurality of NICs, via the at least one physical PCIe cable.

In accordance with one aspect of the present disclosure, a computer-implemented method for setting a peripheral component interconnect express (PCIe) topology in a computing system, comprises: receiving a request for a specific PCIe topology of the computing system; determining current connection routes among a plurality of CPUs, a plurality of PCIe switches, a plurality of NICs, and a plurality of FPGAs and/or GPUs in the computing system; determining whether the current connection routes are consistent with the specific PCIe topology; and in an event that the connection routes among the plurality of CPUs, the plurality of PCIe switches and the plurality of NICs are inconsistent with the specific PCIe topology, adjusting at least one connection route among the plurality of CPUs, the plurality of PCIe switches and the plurality of NICs.

In accordance with another aspect of the present disclosure, a non-transitory computer-readable storage medium storing instructions is provided. The instructions, when executed by a processor of a computing system, cause the processor to perform operations including: receiving a request for a specific PCIe topology of the computing system; determining current connection routes among a plurality of CPUs, a plurality of PCIe switches, a plurality of NICs, and a plurality of FPGAs and/or GPUs in the computing system; determining whether the current connection routes are consistent with the specific PCIe topology; and in an event that the connection routes among the plurality of CPUs, the plurality of PCIe switches and the plurality of NICs are inconsistent with the specific PCIe topology, adjusting at least one connection route among the plurality of CPUs, the plurality of PCIe switches and the plurality of NICs.

Additional features and advantages of the disclosure will be set forth in the description that follows, and will in part be obvious from the description; or can be learned by the practice of the principles set forth herein. The features and advantages of the disclosure can be realized and obtained by means of the instruments and combinations particularly pointed out in the appended claims.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims:

DETAILED DESCRIPTION

Figure 1:
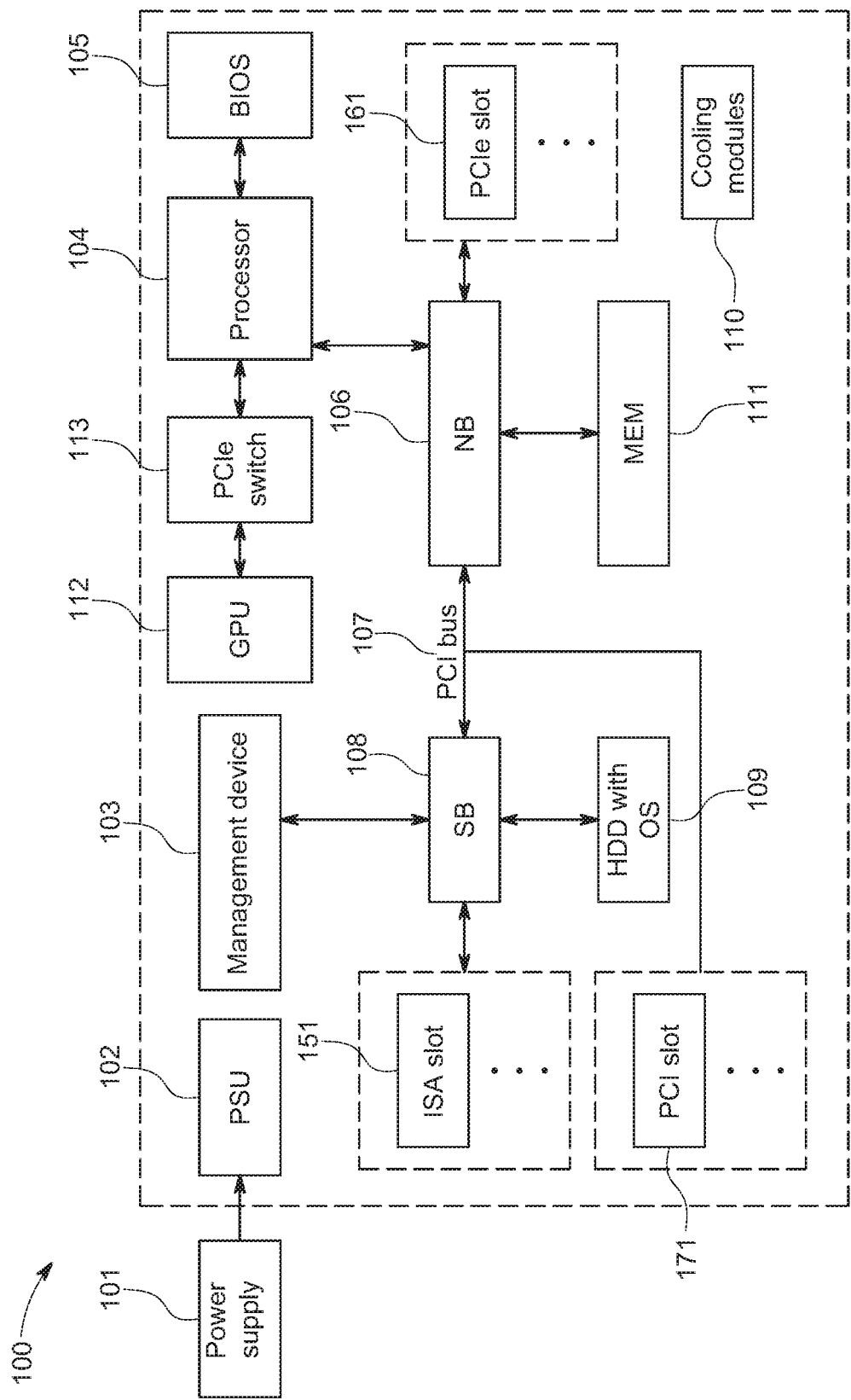
FIG. 1 is a schematic block diagram illustrating an exemplary system having a plurality of CPUs, a plurality of PCIe switches, and a plurality of GPUs with a flexible configuration, in accordance with an implementation of the present disclosure.

The present disclosure can be embodied in many different forms. Representative embodiments are shown in the drawings, and will herein be described in detail. These embodiments are examples or illustrations of the principles of the disclosure but are not intended to limit its broad aspects. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Various examples of the present disclosure provide systems and methods for enabling a flexible PCIe topology in a computing system. The flexible PCIe topology can allow a user or a management controller of the computing system to adjust PCIe connections between CPUs and components of the computing system based upon a specific application. In some implementations, the computing system comprises a plurality of CPUs, a plurality of GPUs or Field-Programmable Gate Arrays (FPGAs), a plurality of PCIe switches, and a plurality of network interface controllers (NICs). In some implementations, the computing system comprises a switch circuit to connect the plurality of CPUs, the plurality of PCIe switches, and the plurality of NICs. The switch circuit comprises a plurality of inputs and a plurality of outputs to connect the plurality of CPUs, the plurality of PCIe switches and the plurality of NICs. Connection routes within the switch circuit can be adjusted to set a specific PCIe topology of the computing system.

FIG. 1 is a schematic block diagram illustrating an exemplary system 100 having a plurality of processors 104, a plurality of PCIe switch 113, and a plurality of GPUs or FPGAs 112 with a flexible configuration, in accordance with an implementation of the present disclosure. In this example, the computing system 100 includes GPUs 112, processors 104, PCIe switches 113, one or more cooling modules 110, a main memory (MEM) 111, and at least one power supply unit (PSU) 102 that receives an AC power from an AC power supply 101. The PSU 102 provides power to various components of the computing system 100, such as the processors 104, north bridge (NB) logic 106, PCIe slots 161, south bridge (SB) logic 108, storage device 109, ISA slots 151, PCI slots 171, and a management controller 103.

In this example, the GPUs or FPGAs 112 are connected to the processors 104 via the PCIe switches 113. The PCIe switches 113 enables high-speed serial point-to-point connections among multiple I/O devices, GPUs or FPGAs 112, and processors 104 for optimized aggregation, fan-out, or peer-to-peer communication of end-point traffic to a host. In some examples, the computing system 100 further comprises NICs (not shown) that connect to the PCIe switches 113. The NICs connect the computing system 100 to a computer network.

The processors 104 can be central processing units (CPUs) configured to execute program instructions for specific functions. For example, during a booting process, the processors 104 can access firmware data stored in the management device 103 or the flash storage device, and execute the BIOS 105 to initialize the computing system 100. After the booting process, the processors 104 can execute an operating system (OS) in order to perform and manage specific tasks for the computing system 100.

In some configurations, each of the processors 104 is coupled together through a CPU bus (not shown) connected to the NB logic 106. In some configurations, the NB logic 106 can be integrated into the processors 104. The NB logic 106 can also be connected to a plurality of peripheral component interconnect express (PCIe) slots 161 and an SB logic 108 (optional). The plurality of PCIe slots 161 can be used for connections and buses such as PCI Express x1, USB 2.0, SMBus, SIM card, future extension for another PCIe lane, 1.5 V and 3.3 V power, and wires to diagnostics LEDs on the computing system 100's chassis.

In computing system 100, the NB logic 106 and the SB logic 108 are connected by a peripheral component interconnect (PCI) Bus 107. The SB logic 108 can couple the PCI Bus 107 to a plurality of expansion cards or ISA slots 150 (e.g., an ISA slot 151) via an expansion bus. The SB logic 108 is further coupled to the management device 103 that is connected to the at least one PSU 102. In some implementations, the management device 103 can be a specialized microcontroller embedded on the motherboard of the server system 100A. The management device 103 can be a baseboard management controller (BMC) or a rack management controller (RMC).

In some implementations, the processors 104 are connected to the PCIe switches 113 via a switch circuit (not shown). The switch circuit comprises a plurality of inputs and a plurality of outputs to connect the plurality of processors 104, the plurality of PCIe switches 113, and the plurality of NICs (not shown). Connection routes within the switch circuit can be adjusted to set a specific PCIe topology of the computing system 100. The specific PCIe topology includes a full configuration mode, a balance mode, a common mode, and a cascade mode.

In some implementations, at least one connection route among the plurality of processors 104, the plurality of PCIe switches 113, and the plurality of NICs includes multiple mini SAS connectors (not shown), and at least one physical PCIe cable (not shown). A specific PCIe topology of the computing system 100 can be set by adjusting connection routes among the multiple mini SAS connectors and/or a golden finger repeater board installed on one of the plurality of NICs, via the at least one physical PCIe cable.

Implementations of the PCIe configuration in FIG. 1 is further illustrated in FIGS. 2A-2E. In FIGS. 2A-2E, multiple mini Serial Attached SCSI (SAS) connectors and at least one physical PCIe cable are used to set a flexible PCIe topology in a computing system. The specific PCIe topology includes, but is not limited to, a full configuration mode, a balance mode, a common mode, and a cascade mode.

Figure 2A:
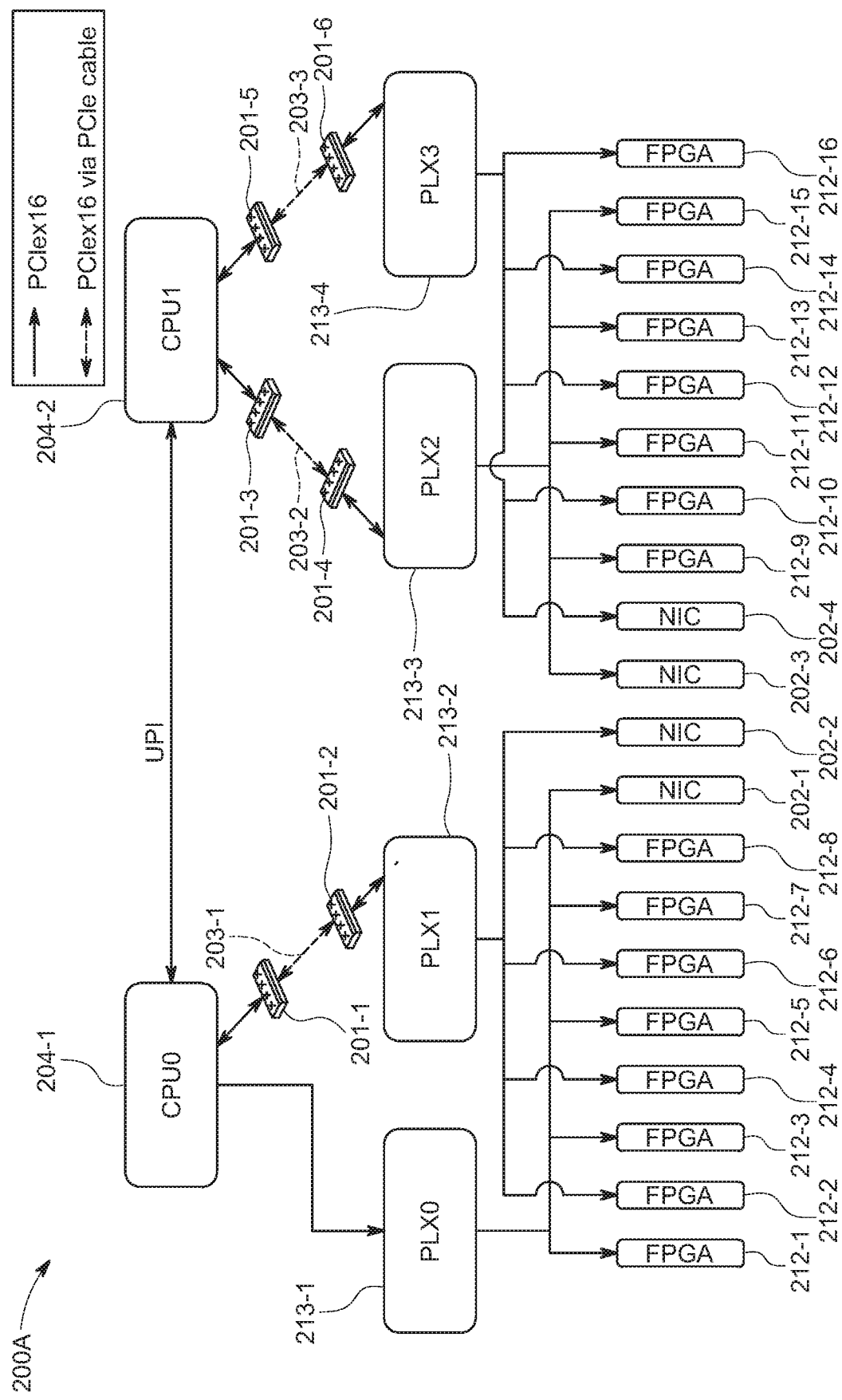
FIGS. 2A-2E are schematic block diagrams illustrating an exemplary system, in which at least one connection route among a plurality of CPUs, a plurality of PCIe switches and a plurality of NICs includes multiple mini SAS connectors, and a physical PCIe cable, in accordance with an implementation of the present disclosure.

FIG. 2A illustrates a general PCIe topology of a computing system 200A. The computing system 200A comprises CPUs 204-1 and 204-2, FPGAs 212-1 thru 212-16, NICs 202-1 thru 202-4, PCIe switches 213-1 thru 213-4, and SAS connectors 201-1 thru 201-6. In this example, the CPU 204-1 is connected to the CPU 204-2 via a UltraPath Interconnect (UPI). The CPU 204-1 is connected to the PCIe switch 213-1 via a PCIe connection, and connected to the PCIe switch 213-2 via two SAS connectors 201-1, 201-2 and a PCIe cable 203-1. The CPU 204-2 is connected to the PCIe switch 213-3 via two SAS connectors 201-3, 201-4 and a PCIe cable 203-2, and connected to the PCIe switch 213-4 via two SAS connectors 201-5, 201-6 and a PCIe cable 203-3. The PCIe switch 213-1 is connected to the FPGAs 212-1, 212-3, 212-5 and 212-7, and the NIC 202-1. The PCIe switch 213-2 is connected to the FPGAs 212-2, 212-4, 212-6 and 212-8, and the NIC 202-2. The PCIe switch 213-3 is connected to the FPGAs 212-9, 212-11, 212-13 and 212-15, and the NIC 202-3. The PCIe switch 213-4 is connected to the FPGAs 212-10, 212-12, 212-14 and 212-16, and the NIC 202-4.

The PCIe topology in the computing system 200A can be adjusted to a full configuration mode, a balance mode, a common mode, and a cascade mode, which are illustrated in FIGS. 2B-2E, respectively.

Figure 2B:
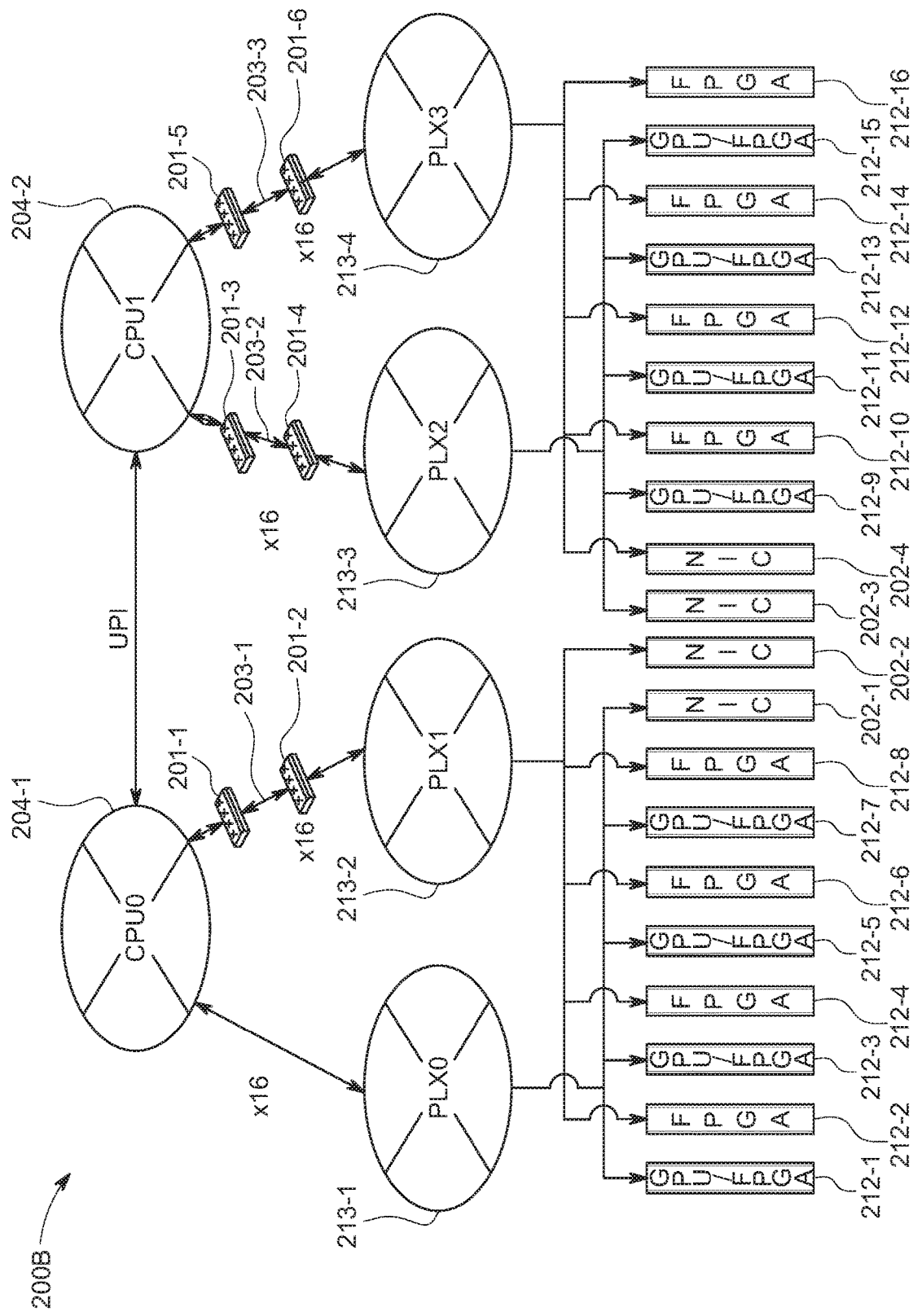

In FIG. 2B, the PCIe topology of the computing system 200B is a full configuration mode. The computing system 200B comprises CPUs 204-1 and 204-2, FPGAs or GPUs 212-1 thru 212-16, NICs 202-1 thru 202-4, PCIe switches 213-1 thru 213-4, and SAS connectors 201-1 thru 201-6. Connected routes between the above components of the computing system 200B are the same as those illustrated in FIG. 2A. In the full configuration mode, the computing system 200B supports all downstream of PCIe switches 213-1 thru 213-4 to the endpoint devices. In this example, the computing system 200B has 4 PCIe switches and have to support up to 20 PCIex16 endpoint devices.

Figure 2C:
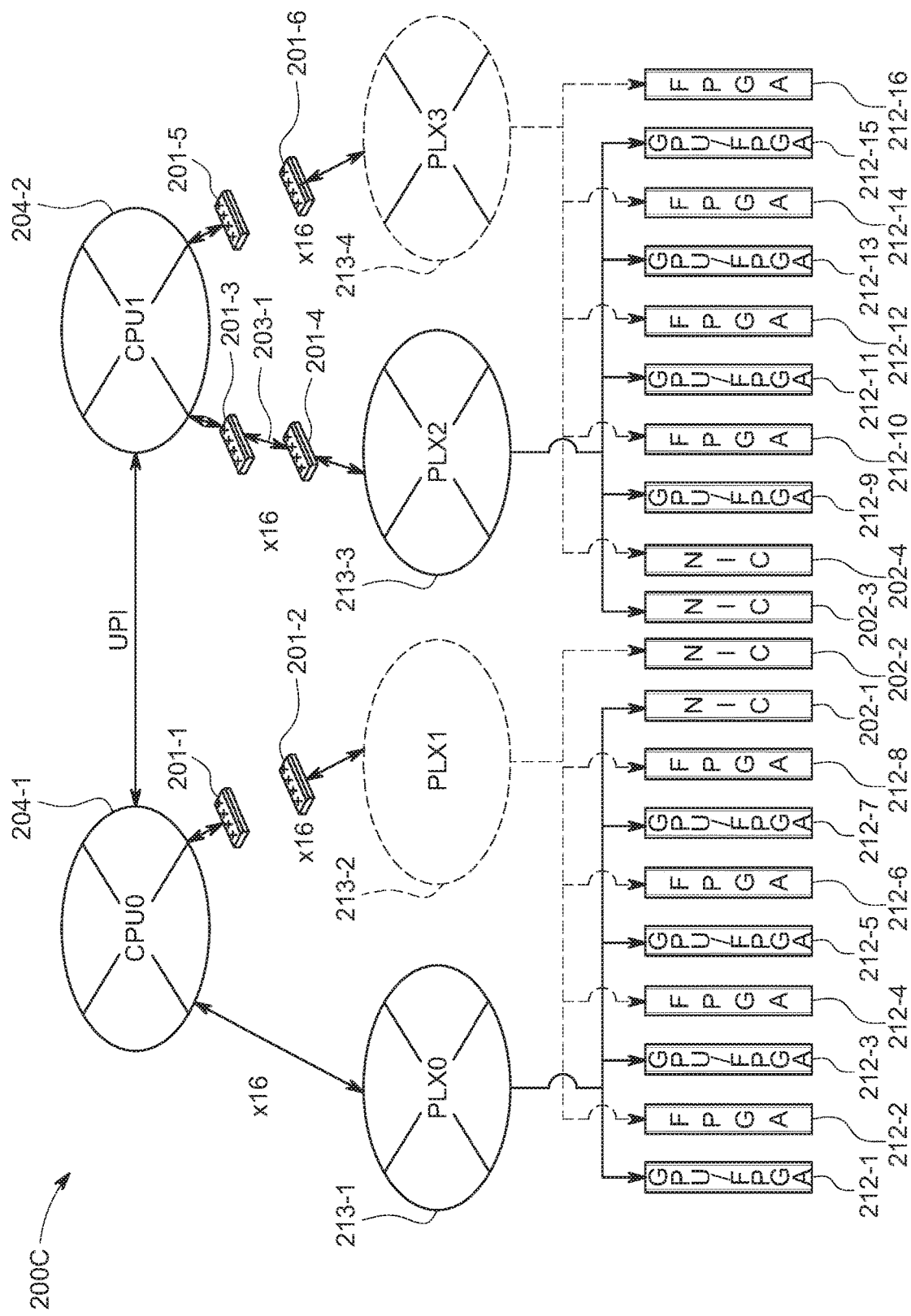

In FIG. 2C, the PCIe topology of the computing system 200C is a balance mode. The computing system 200C comprises CPUs 204-1 and 204-2, FPGAs or GPUs (i.e., 212-1, 212-3, 212-5, 212-7, 212-9, 212-11, 212-13 and 212-15), NICs 202-1 and 202-3, PCIe switches 213-1 and 213-3, and SAS connectors 201-1 thru 201-6. Comparing the full configuration mode in FIG. 2B and the balance mode in FIG. 2C, the PCIe switches 213-2 and 213-4 are not needed or not mounted in the computing system 200C. A PCIe cable 203-1 is used to connect SAS connectors 201-3 and 201-4. The SAS connectors 201-3 and 201-4 are connected to the CPU 204-2 and the PCIe switch 213-3, respectively. In the balance mode, each CPU of the computing system 200C connects to one PCIe switch and to all downstream of the corresponding PCIe switch. In this example, each of CPUs 204-1 and 204-2 connects to a PCIe switch, and thus each CPU PCIe root port can connect up to 5 PCIex16 endpoint device via its corresponding PCIe switches 213-1 and 213-3, respectively.

Figure 2D:
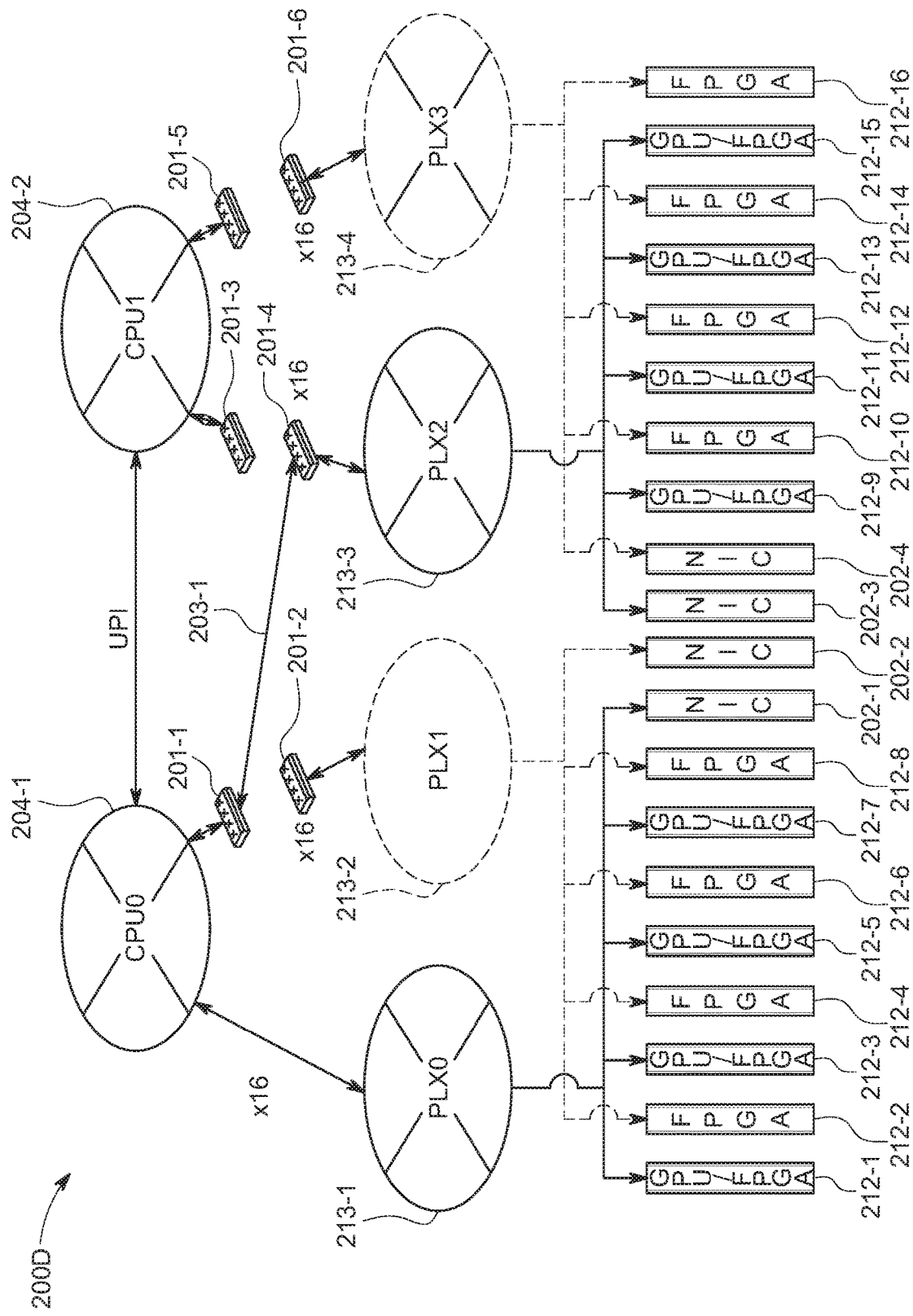

In FIG. 2D, the PCIe topology of the computing system 200D is a common mode. Similar to the computing system 200C in FIG. 2C, PCIe switches 213-2 and 213-4 are not needed or not mounted in the computing system 200D. However, in the computing system 200D, the PCIe cable 203-1 is used to connect SAS connectors 201-1 and 201-4. The SAS connectors 201-1 and 201-4 are connected to the CPU 204-1 and the PCIe switch 213-3, respectively. The remaining connection routes of the PCIe topology of the computing system 200D is the same as those of the PCIe topology of the computing system 200C. By adjusting the PCIe cable 203-1 connecting SAS connectors 201-4, 201-1 and/or 201-3, the PCIe topology can be switched between the common mode and the balance mode. In the common mode, a CPU of the computing system 200D connects to two PCIe switches and to all downstream of two PCIe switches. In this example, CPU 204-1 connects to active PCIe switches 213-1 and 213-3, and end point devices 213-1, 212-3, 212-5, 212-7, 202-1, 202-3, 212-9, 212-11, 212-13, and 212-15. Data from these end point devices are transferred directly to CPU 204-1, instead of requiring some data being transferred from CPU204-2 via UPI.

Figure 2E:
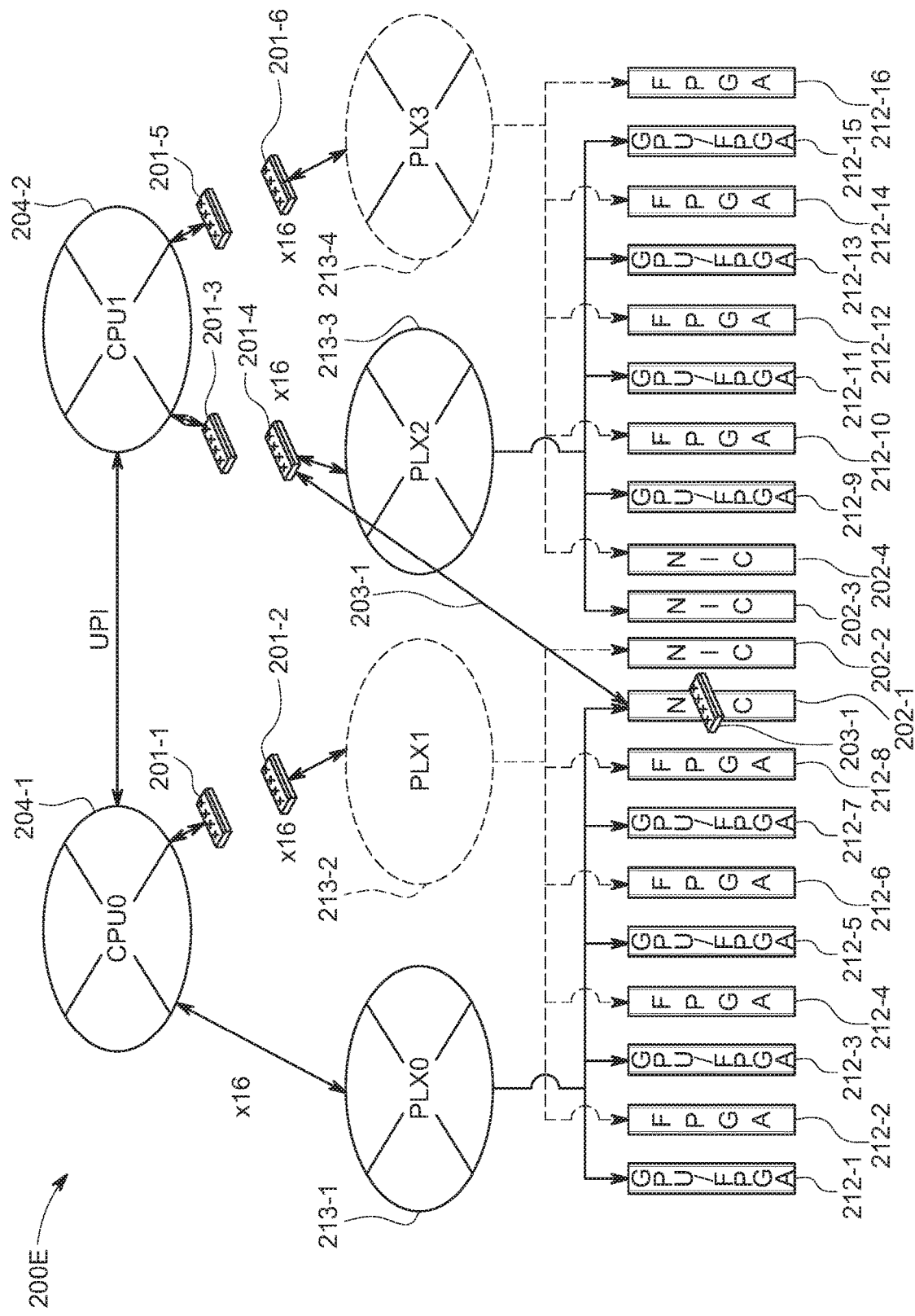

In FIG. 2E, the PCIe topology of the computing system 200E is a cascade mode. Similar to the computing systems 200C and 200D in FIG. 2C and FIG. 2D, respectively, PCIe switches 213-2 and 213-4 are not needed or not mounted in the computing system 200E. However, in the computing system 200E, the PCIe cable 203-1 is used to connect SAS connector 201-4 and a golden finger repeater board 203-1 installed on NIC 202-1. The SAS connector 201-4 is connected to the PCIe switch 213-3. The golden finger repeater board 203-1 is configured to pass PCIe signal from the NIC 202-1 to a SAS communication channel (e.g., the PCIe cable 203-1) and the PCIe switch 213-3. In the cascade mode, a CPU of the computing system 200D connects to two PCIe switches and to all downstream of two PCIe switches. In this example, CPU 204-1 connects to active PCIe switches 213-1 and 213-3, and end point devices 213-1, 212-3, 212-5, 212-7, 202-1, 202-3, 212-9, 212-11, 212-13, and 212-15. Data from these end point devices are transferred directly to CPU 204-1, instead of requiring some data being transferred from CPU204-2 via UPI. In the cascade mode, a CPU of the computing system 200E connects to a first PCIe switch, while a second PCIe switch cascades under the first PCIe switch. Thus, the CPU can connect to all active endpoint devices, and transfer data between the first and second PCIe switches without being limited by throughput of CPUs of the computing system 200E. In this example, CPU 204-1 connects to the first PCIe switch 213-1, while the second PCIe switch 213-3 connects to the first PCIe switch 213-1 via NIC 202-1.

As illustrated above in FIGS. 2A thru 2E, multiple mini Serial Attached SCSI (SAS) connectors and at least one physical PCIe cable can be used to set a flexible PCIe topology in computing systems 200A thru 200E. However, the present disclosure contemplates that a switching circuit can be used to switch the PCIe topology between the different modes. This is illustrated in FIGS. 3A-3F.

FIGS. 3A-3F are schematic block diagrams illustrating exemplary systems 300A-300F comprising a switch circuit 301 to set a specific PCIe topology of the exemplary systems, in accordance with an implementation of the present disclosure. The switch circuit 301 is configured to set the specific PCIe topology based upon a request of a management controller or a user of the exemplary systems.

Figure 3A:
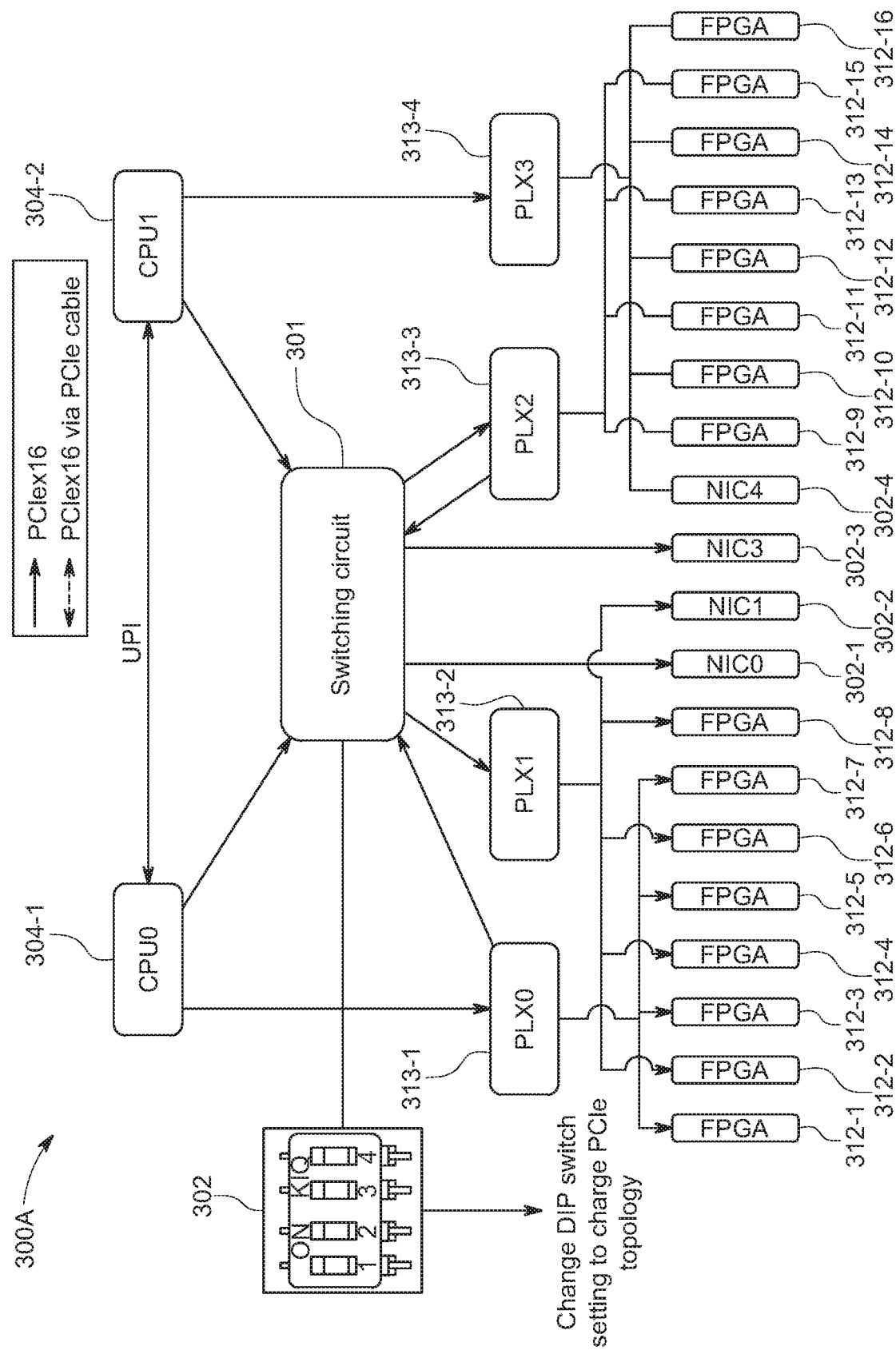
FIGS. 3A-3F are schematic block diagrams illustrating an exemplary system comprising a switch circuit to set a specific PCIe topology of the exemplary system, in accordance with an implementation of the present disclosure.

In FIG. 3A, the computing system 300A comprises CPUs 304-1 and 304-2, FPGAs 312-1 thru 312-16, NICs 302-1 thru 302-4, PCIe switches 313-1 thru 313-4, and a switching circuit 301 that connects the CPUs (i.e., 304-1 and 304-2), the PCIe switches (i.e., 313-1 thru 313-4), and the NICs (i.e., 302-1 and 302-3). In this example, the CPU 304-1 is connected to the CPU 304-2 via a UltraPath Interconnect (UPI). The CPU 304-1 is also connected to the PCIe switch 313-1 while the CPU 304-2 is also connected to the PCIe switch 313-4. The PCIe switch 313-1 is connected to the FPGAs 312-1, 312-3, 312-5 and 312-7. The PCIe switch 313-2 is connected to the FPGAs 312-2, 312-4, 312-6 and 312-8, and the NIC 302-2. The PCIe switch 313-3 is connected to the FPGAs 312-9, 312-11, 312-13 and 312-15. The PCIe switch 313-4 is connected to the FPGAs 312-10, 312-12, 312-14 and 312-16, and the NIC 302-4.

In this example, the switch circuit 301 has four inputs (i.e., from the CPUs 304-1 and 304-2, and from the PCIe switches 313-1 and 313-3), and four outputs (i.e., to the PCIe switches 313-2 and 313-3, and to the NICs 302-1 and 302-3). In this example, a DIP switch 302 is used to set connection routes within the switch circuit.

Figure 3B:
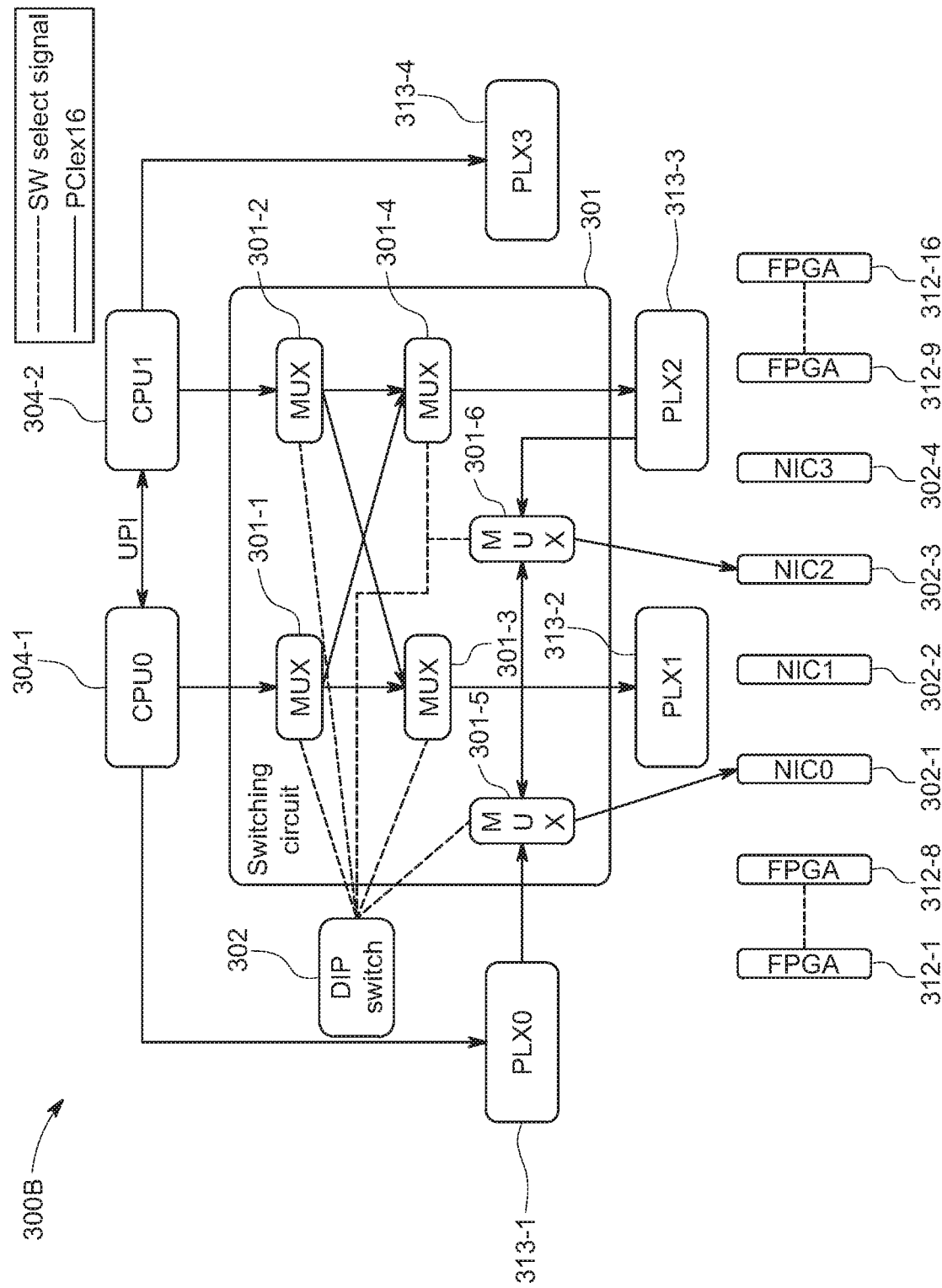

In some implementations, the switch circuit 301 comprises a plurality of MUXs (i.e., 301-1 thru 301-6) to connect the CPUs (i.e., 304-1 and 304-2), the PCIe switches (i.e., 313-1 thru 313-4), and the NICs (i.e., 302-1 and 302-3), which is illustrated in FIG. 3B. The DIP switch 302 can set connection status of each of the plurality of MUXs (i.e., 301-1 thru 301-6), and hence set connection routes among four inputs and four output of the switch circuit 301.

Figure 3C:
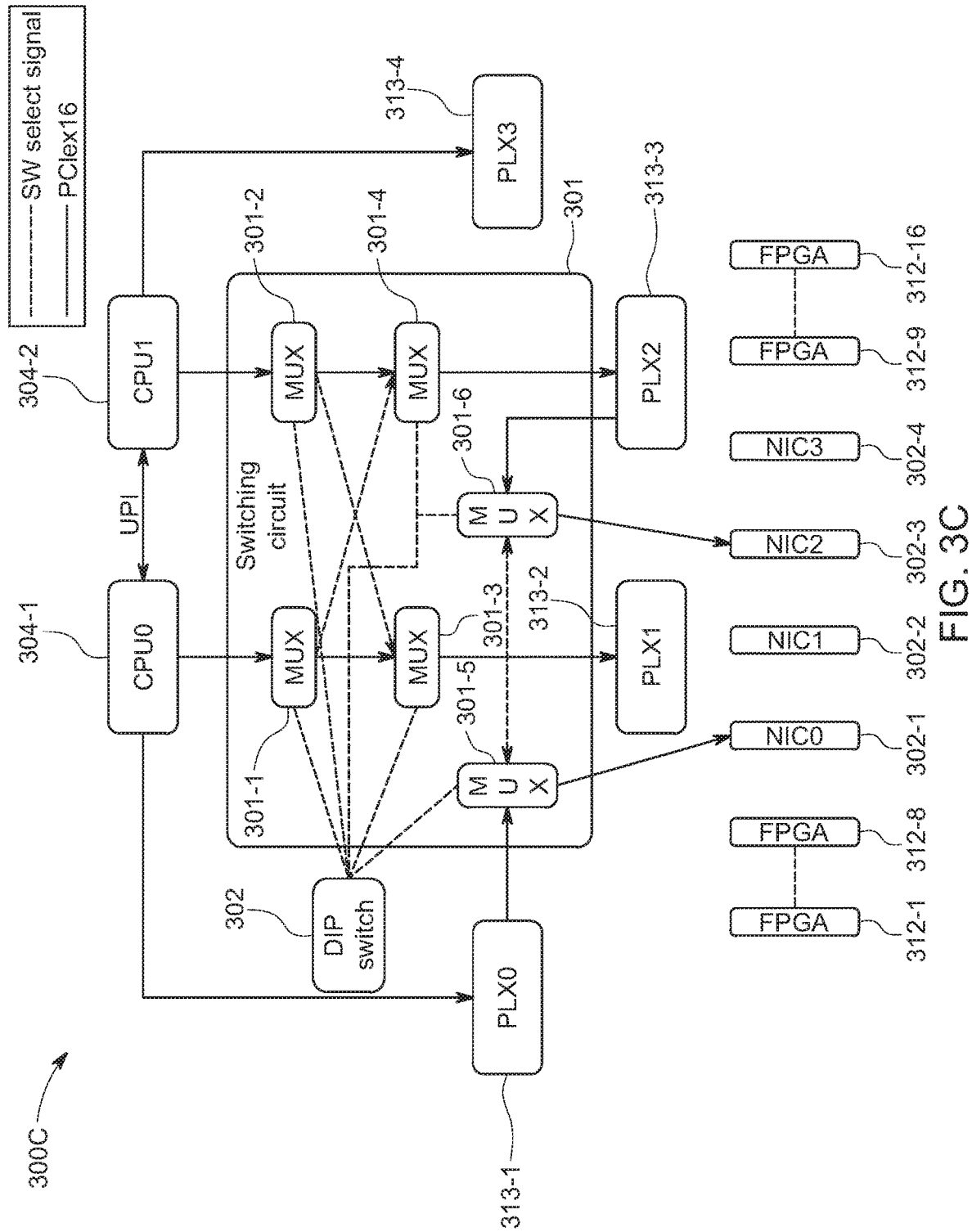

In FIG. 3C, the PCIe topology of the computing system 300C is a full configuration mode. The computing system 300C comprises CPUs 304-1 and 304-2, FPGAs or GPUs 312-1 thru 312-16, NICs 302-1 thru 302-4, PCIe switches 313-1 thru 313-4, and SAS connectors 301-1 thru 301-6. In this example, the DIP switch 302 sets input of the switch circuit 301 from the CPU 304-1 to the MUX 301-1, then to the MUX 301-3, and to the PCIe switch 313-2. Also, the DIP switch 302 sets input of the switch circuit 301 from the CPU 304-2 to the MUX 301-2, then to the MUX 301-4, and to the PCIe switch 313-3. The DIP switch 302 further sets input of the switch circuit 301 from the PCIe switch 313-1 to the MUX 301-5, and then to the NIC 302-1. Also, the DIP switch 302 sets input of the switch circuit 301 from the PCIe switch 313-3 to the MUX 301-6, and then to the NIX 302-3. All other connection routes within the switching circuit 301 are disenabled by the DIP switch 302 in the computing system 300C.

Figure 3D:
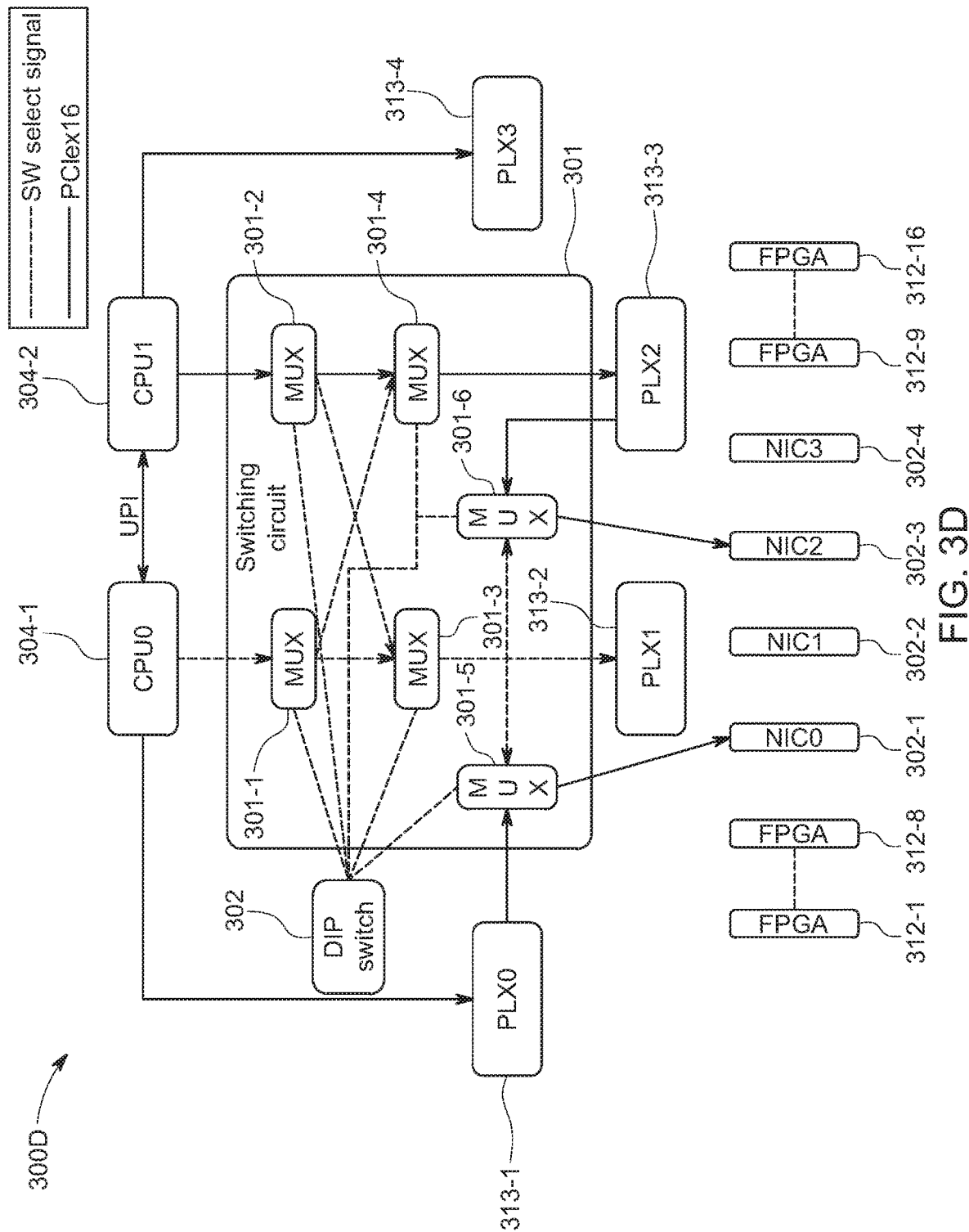

In FIG. 3D, the PCIe topology of the computing system 300D is a balance mode. In this example, the DIP switch 302 sets input of the switch circuit 301 from the CPU 304-2 to the MUX 301-2, then to the MUX 301-4, and to the PCIe switch 313-3. The DIP switch 302 further sets input of the switch circuit 301 from the PCIe switch 313-1 to the MUX 301-5, and then to the NIC 302-1. Also, the DIP switch 302 sets input of the switch circuit 301 from the PCIe switch 313-3 to the MUX 301-6, and then to the NIX 302-3. All other connection routes within the switching circuit 301 are disenabled by the DIP switch 302 in the computing system 300D.

Figure 3E:
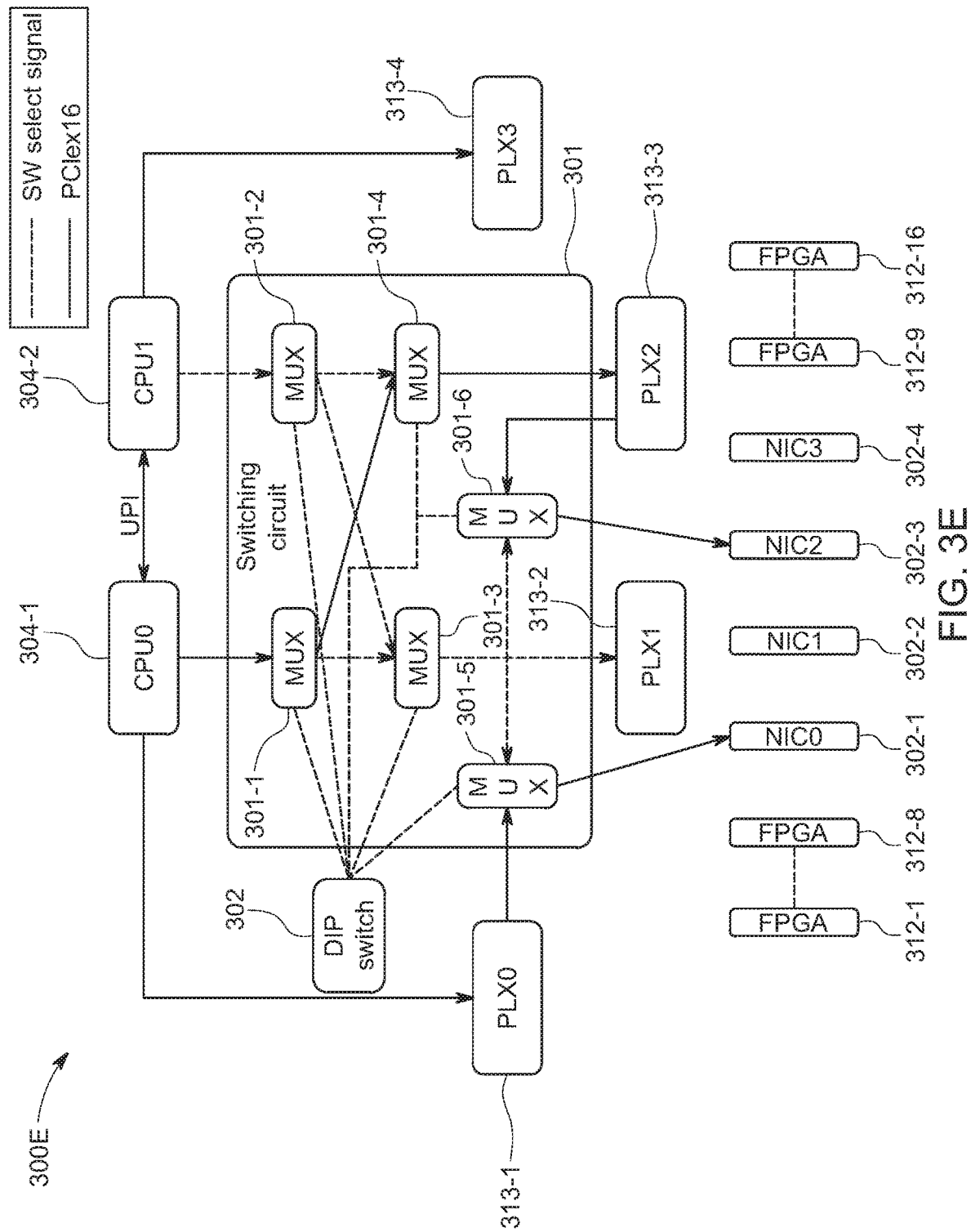

In FIG. 3E, the PCIe topology of the computing system 300E is a common mode. In this example, the DIP switch 302 sets input of the switch circuit 301 from the CPU 304-1 to the MUX 301-1, then to the MUX 301-4, and to the PCIe switch 313-3. The DIP switch 302 further sets input of the switch circuit 301 from the PCIe switch 313-1 to the MUX 301-5, and then to the NIC 302-1. Also, the DIP switch 302 sets input of the switch circuit 301 from the PCIe switch 313-3 to the MUX 301-6, and then to the NIX 302-3. All other connection routes within the switching circuit 301 are disenabled by the DIP switch 302 in the computing system 300E.

Figure 3F:
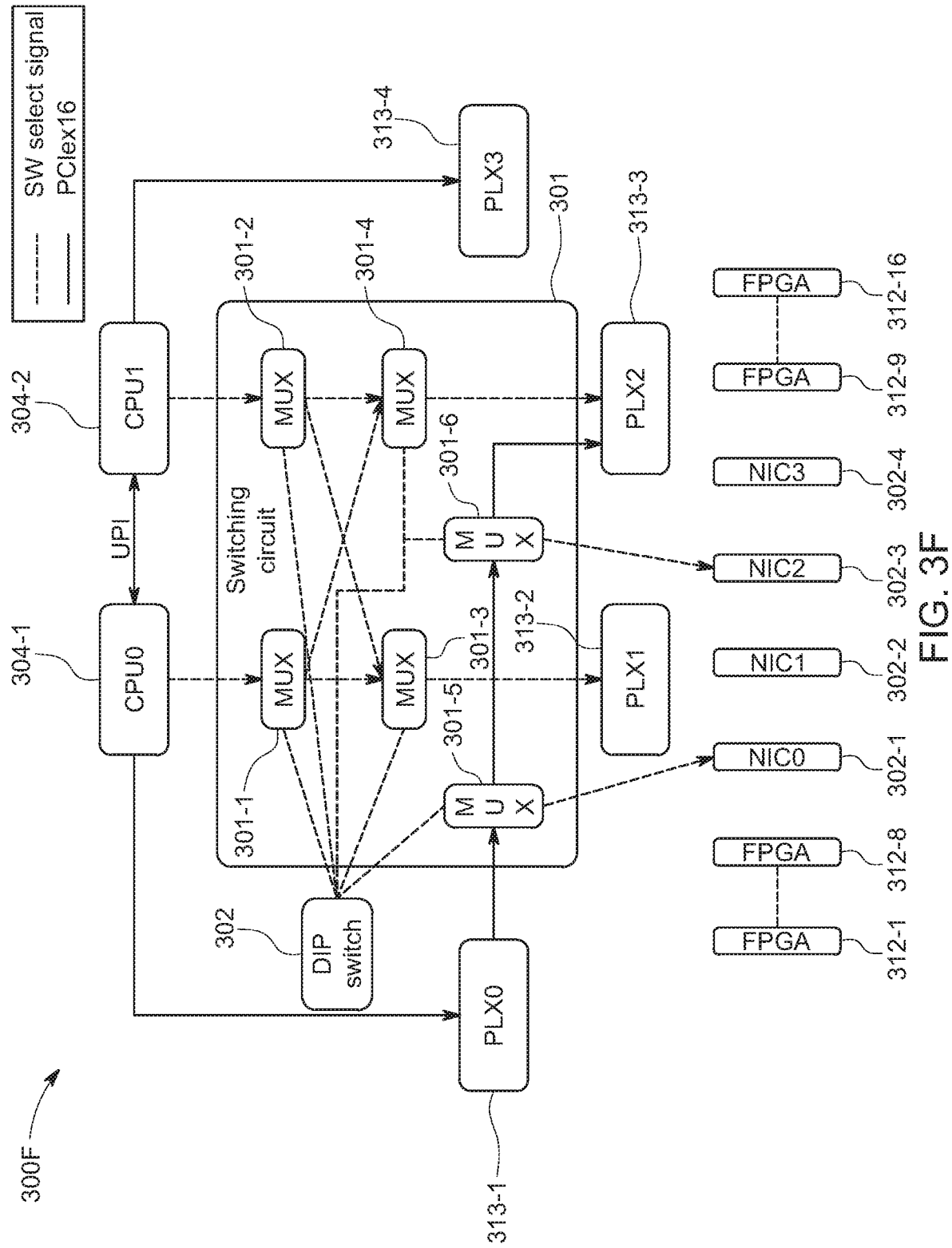

In FIG. 3F, the PCIe topology of the computing system 300F is a cascade mode. In this example, the DIP switch 302 sets input of the switch circuit 301 from the PCIe switch 313-1 to the MUX 301-5, then to the MUX 301-6, and then to the PCIe switch 313-3. All other connection routes within the switching circuit 301 are disenabled by the DIP switch 302 in the computing system 300F.

As illustrated above in FIGS. 3A thru 3F, the switch circuit 301 can be used to set a flexible PCIe topology in computing systems 300A thru 300F. The PCIe topology set by the switch circuit 301 includes, but is not limited to, a full configuration mode, a balance mode, a common mode, and a cascade mode.

Figure 4:
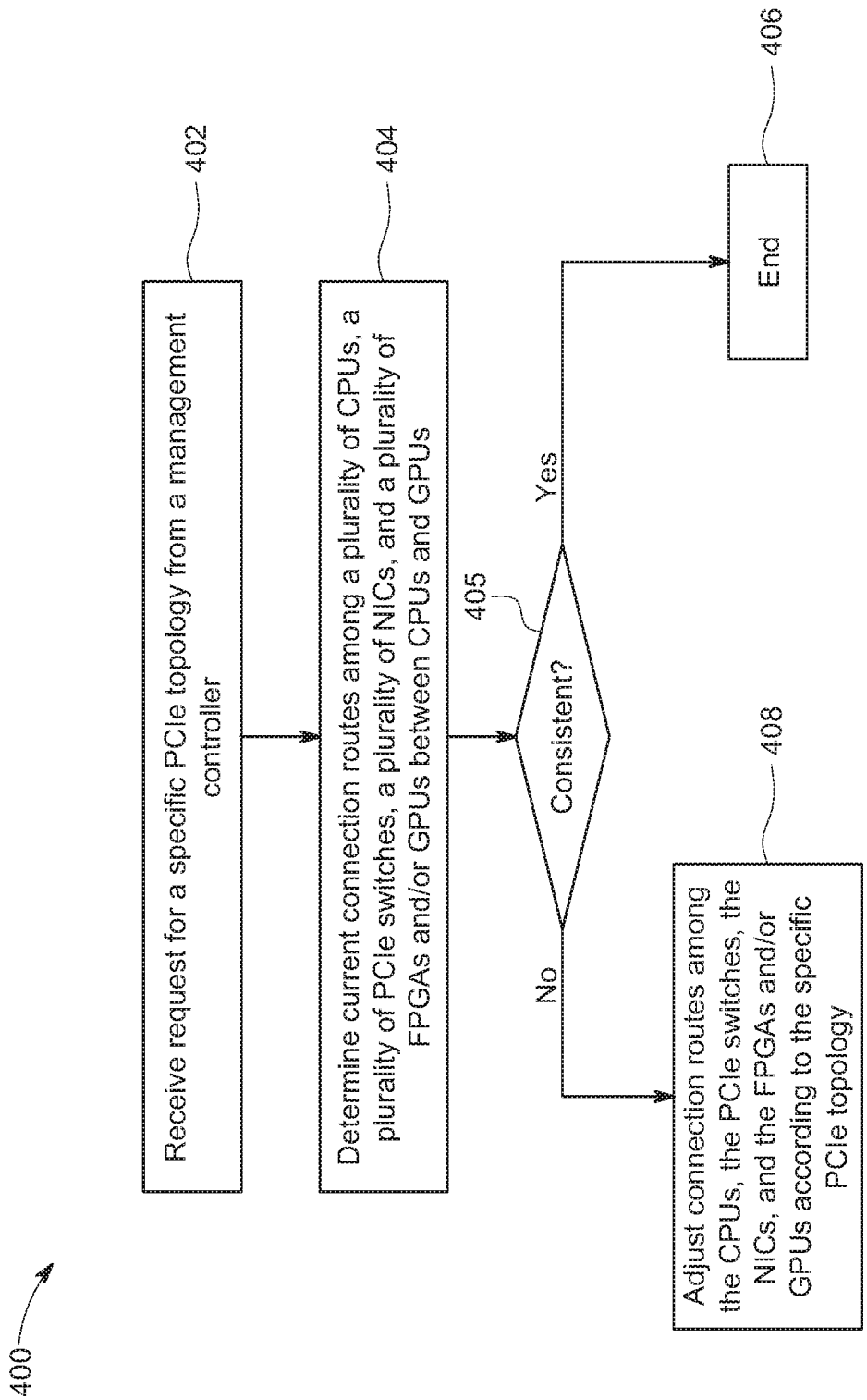
FIG. 4 is an exemplary method for setting a PCIe topology in a computing system, in accordance with an implementation of the present disclosure.

FIG. 4 is an exemplary method 400 for setting a PCIe topology in a computing system, in accordance with an implementation of the present disclosure. It should be understood that the exemplary method 400 is presented solely for illustrative purposes, and that other methods in accordance with the present disclosure can include additional, fewer, or alternative steps performed in similar or alternative orders, or in parallel. The exemplary method 400 starts at step 402 by receiving a request for a specific PCIe topology for the computing system. In some implementations, the request can be from a management controller (e.g., BMC) or a user of the computing system. The specific PCIe topology includes, but is not limited to, a full configuration mode, a balance mode, a common mode, and a cascade mode.

At step 404, the management controller can determine current connection routes among a plurality of CPUs, a plurality of PCIe switches, a plurality of NICs, and a plurality of FPGAs and/or GPUs in the computing system. In some implementations, the computing system comprises a switch circuit that comprises a plurality of inputs and a plurality of outputs. The inputs and outputs of the switch circuit connect the plurality of CPUs, the plurality of PCIe switches, the plurality of NICs, and the plurality of FPGAs and/or GPUs. In some implementations, the switch circuit comprises a plurality of MUXs. A DIP switch connected to the switch can set connection status of each of the plurality of MUXs), and hence set connection routes among the plurality of inputs and the plurality of outputs of the switch circuit.

At step 405, the management controller can determine current connection routes can determine whether the current connection routes among the CPUs, the PCIe switches, the NICs, and the FPGAs and/or GPUs are consistent with the specific PCIe topology. In an event that the current connection routes among the CPUs, the PCIe switches, the NICs, and the FPGAs and/or GPUs are consistent with the specific PCIe topology, the process 400 ends at step 406. In an event that the current connection routes among the CPUs, the PCIe switches, the NICs, and the FPGAs and/or GPUs are inconsistent with the specific PCIe topology, the management controller can cause the connection routes among the plurality of inputs and the plurality of outputs of the switch circuit to be adjusted such that the connection routes are consistent with the specific PCIe topology, at step 408. In some implementations, the management controller can adjust the settings of the DIP switch to set connection status of each of the plurality of MUXs in the switch circuit.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A computing system, comprising:
    a plurality of Central Processing Units (CPUs) including a first CPU and a second CPU configured to connect with each other;
    a plurality of endpoint devices including (1) a plurality of Graphics Processing Units (GPUs) or Field-Programmable Gate Arrays (FPGAs) and (2) a plurality of network interface controllers (NICs);
    a plurality of Peripheral Component Interconnect Express (PCIe) switches including a first PCIe switch and a second PCIe switch, the first PCIe switch configured to connect the first CPU to a first set of the plurality of endpoint devices, the second PCIe switch configured to connect the second CPU to a second set of the plurality of endpoint devices; and a connection mechanism that enables at least one connection route among the plurality of CPUs, the plurality of PCIe switches, and the plurality of end point devices to be adjusted to set a specific PCIe topology of the computing system, wherein the specific PCIe topology includes a full configuration mode and a balance mode;

wherein in the full configuration mode and in the balance mode, the first CPU is configured to connect to the second set of endpoint devices via the second CPU; and wherein in the full configuration mode, the first CPU is configured to connect to a third set of the plurality of endpoint devices via a third PCIe switch.

2. The computing system of claim 1, wherein the specific PCIe topology further includes a common mode; and wherein in the common mode, the first CPU is configured to connect to the second set of endpoint devices via the second PCIe switch.

3. The computing system of claim 2, wherein the connection mechanism comprises a plurality of mini Serial Attached SCSI (SAS) connectors, at least one physical PCIe cable, and a golden finger repeater board installed on one of the plurality of NICs.

4. The computing system of claim 2, wherein the specific PCIe topology further includes a cascade mode.

5. The computing system of claim 1, wherein the connection mechanism comprises a switch circuit to connect the plurality of CPUs, the plurality of PCIe switches, and the plurality of end point devices.

6. The computing system of claim 5, further comprising a Dual-Inline-Package (DIP) switch, wherein the DIP switch is configured to set connection routes among a plurality of inputs and a plurality of outputs of the switch circuit.

7. The computing system of claim 6, wherein the switch circuit comprises a plurality of multiplexers (MUXs) to connect the plurality of inputs and the plurality of outputs.

8. The computing system of claim 7, wherein the DIP switch is configured to set connection status of each of the plurality of MUXs, and hence set the connection routes among the plurality of inputs and the plurality of outputs of the switch circuit.

9. A computer-implemented method for setting a peripheral component interconnect express (PCIe) topology in a computing system, comprising:

receiving a request for a specific PCIe topology of the computing system, the specific PCIe topology includes a full configuration mode and a balance mode;

determining current connection routes among a plurality of Central Processing Units (CPUs), a plurality of Peripheral Component Interconnect Express (PCIe) switches, and a plurality of endpoint devices in the computing system, wherein the plurality of CPUs includes a first CPU and a second CPU;

wherein the plurality of endpoint devices includes (1) a plurality of NICs and (2) a plurality of Field-Programmable Gate Arrays (FPGAs) and/or Graphics Processing Units (GPUs) in the computing system; and wherein the plurality of PCIe switches includes a first PCIe switch and a second PCIe switch, the first PCIe switch configured to connect the first CPU to a first set of the plurality of endpoint devices, the second PCIe switch configured to connect the second CPU to a second set of the plurality of endpoint devices;

determining whether the current connection routes are consistent with the specific PCIe topology; and in an event that the current connection routes among the plurality of CPUs, the plurality of PCIe switches and the plurality of NICs are inconsistent with the specific PCIe topology, adjusting at least one connection route among the plurality of CPUs, the plurality of PCIe switches and the plurality of endpoint devices, wherein the adjusting at least one connection route includes connecting the first CPU of the plurality of CPUs to a different PCIe switch;

wherein in the full configuration mode and in the balance mode, the first CPU is configured to connect to the second set of endpoint devices via the second CPU; and wherein in the full configuration mode, the first CPU is configured to connect to a third set of the plurality of endpoint devices via a third PCIe switch.

10. The computer-implemented method of claim 9, wherein the request is received from a management controller or a user of the computing system.

11. The computer-implemented method of claim 9, wherein the computing system comprises a switch circuit to adjust connection routes among the plurality of CPUs, the plurality of PCIe switches, and the plurality of NICs.

12. The computer-implemented method of claim 11, wherein the computing system further comprises a Dual-Inline-Package (DIP) switch configured to set connection routes among a plurality of inputs and a plurality of outputs of the switch circuit.

13. The computer-implemented method of claim 12, wherein the switch circuit comprises a plurality of multiplexers (MUXs) to connect the plurality of inputs and the plurality of outputs.

14. The computer-implemented method of claim 13, wherein the DIP switch is configured to set connection status of each of the plurality of MUXs, and hence set the connection routes among the plurality of inputs and the plurality of outputs of the switch circuit.

15. The computer-implemented method of claim 9, wherein the specific PCIe topology further includes a common mode and a cascade mode.

16. A non-transitory computer-readable storage medium including instructions that, when executed by at least one processor of a computing system, cause the computing system to perform operations comprising:

receiving a request for a specific peripheral component interconnect express (PCIe) topology of the computing system, the specific PCIe topology includes a full configuration mode and a balance mode;

determining current connection routes among a plurality of Central Processing Units (CPUs), a plurality of Peripheral Component Interconnect Express (PCIe) switches, and a plurality of endpoint devices in the computing system, wherein the plurality of CPUs includes a first CPU and a second CPU;

wherein the plurality of endpoint devices includes (1) a plurality of NICs and (2) a plurality of Field-Programmable Gate Arrays (FPGAs) or Graphics Processing Units (GPUs); and wherein the plurality of PCIe switches includes a first PCIe switch and a second PCIe switch, the first PCIe switch configured to connect the first CPU to a first set of the plurality of endpoint devices, the second PCIe switch configured to connect the second CPU to a second set of the plurality of endpoint devices;
determining whether the current connection routes are consistent with the specific PCIe topology; and
in an event that the current connection routes are inconsistent with the specific PCIe topology, adjusting at least one connection route among the plurality of CPUs, the plurality of PCIe switches and the plurality of endpoint devices,
 wherein the adjusting at least one connection route includes connecting the first CPU of the plurality of CPUs to a different PCIe switch;
 wherein in the full configuration mode and in the balance mode, the first CPU is configured to connect to the second set of endpoint devices via the second CPU; and
 wherein in the full configuration mode, the first CPU is configured to connect to a third set of the plurality of endpoint devices via a third PCIe switch.

17. The non-transitory computer-readable storage medium of claim 16, wherein the computing system comprises a switch circuit to adjust connection routes among the plurality of CPUs, the plurality of PCIe switches, and the plurality of NICs.

18. The non-transitory computer-readable storage medium of claim 17, wherein the computing system further comprises a Dual-Inline-Package (DIP) switch configured to set connection routes among a plurality of inputs and a plurality of outputs of the switch circuit.

19. The non-transitory computer-readable storage medium of claim 18, wherein the switch circuit comprises a plurality of mulplexers (MUXs) to connect the plurality of inputs and the plurality of outputs.

20. The non-transitory computer-readable storage medium of claim 19, wherein the DIP switch is configured to set connection status of each of the plurality of MUXs, and hence set the connection routes among the plurality of inputs and the plurality of outputs.

* * * * *